(12) United States Patent
Allen et al.

(10) Patent No.: US 7,025,371 B2
(45) Date of Patent: Apr. 11, 2006

(54) HITCHING APPARATUS AND METHOD OF USE

(76) Inventors: Harold Allen, P.O. Box 23, Fawnskin, CA (US) 92333; Garry Schrade, 39334 Garden Pl., Fawnskin, CA (US) 92333

(*) Notice: Subject to any disclaimer, the term of this patent is extended or adjusted under 35 U.S.C. 154(b) by 0 days.

(21) Appl. No.: 10/818,264

(22) Filed: Apr. 2, 2004

(65) Prior Publication Data
US 2004/0195802 A1    Oct. 7, 2004

Related U.S. Application Data

(60) Provisional application No. 60/460,047, filed on Apr. 4, 2003.

(51) Int. Cl.
*B62D 27/06* (2006.01)
(52) U.S. Cl. .................................... 280/491.5; 280/477
(58) Field of Classification Search ............. 280/491.5, 280/477, 504
See application file for complete search history.

(56) References Cited

U.S. PATENT DOCUMENTS

| | | | | |
|---|---|---|---|---|
| 3,837,679 A * | 9/1974 | Dickmann | ............... | 280/491.5 |
| 3,891,237 A * | 6/1975 | Allen | ......................... | 280/477 |
| 4,666,177 A * | 5/1987 | Vinchattle | .................... | 280/477 |
| 4,844,497 A * | 7/1989 | Allen | ......................... | 280/477 |
| 4,991,865 A * | 2/1991 | Francisco | ................... | 280/477 |
| 6,142,502 A * | 11/2000 | Breslin | ....................... | 280/506 |
| 2002/0101055 A1* | 8/2002 | Warren | ....................... | 280/477 |

* cited by examiner

*Primary Examiner*—Tony Winner
(74) *Attorney, Agent, or Firm*—Gene Scott; Patent Law & Venture Group

(57) ABSTRACT

A hitch receiver has a clamp-on funnel shaped open mouth for receiving and guiding a hitch shank entry. Attached in the funnel mouth of the hitch receiver, a shank neutral position indicator includes a generally horizontal spring mounted with one end of the spring held at one side of the open mouth and an opposing end of the spring loosely held and movable within a vertical elongate slot on the other side of the open mouth. The spring is positioned such that with a hitch shank centered within the hitch receiver, the hitch shank moves the spring to a center position of the elongate slot thereby indicating that receiver and shank are mutually free for disengagement. A hitch shank engagement limiter within the hitch receiver, has an adjustable length which is selected for stopping hitch shank entry travel into the hitch receiver when receiver and shank hitch pin holes are aligned.

7 Claims, 4 Drawing Sheets

HITCHING APPARATUS AND METHOD OF USE

RELATED APPLICATIONS

This application claims the priority date set by a previously filed Provisional Patent application having serial number 60/460,047 and filing date of Apr. 4, 2003 and entitled: Shank Guide In and Out Hitching and Unhitching System.

INCORPORATION BY REFERENCE

Applicant(s) hereby incorporate herein by reference, any and all U.S. patents and U.S. patent applications cited or referred to in this application.

BACKGROUND OF THE INVENTION

1. Field of the Invention

This invention relates generally to trailer hitch systems and their methods of use and in particular to a hitch system with neutral load indicator and shank guide and insertion stop.

2. Description of Related Art

The following art defines the present state of this field:

Wasservogel, U.S. Pat. No. 4,348,035 describes towing attachments for attaching trailers to the end of various vehicles including a tubular sleeve attached to the vehicle, an extension bar having one end rotatably attached to the tow bar of the trailer while the other end is adapted to be releasably attached to the tubular sleeve and having a cross-sectional shape which is complementary to that of the tubular sleeve so that it may slide smoothly into same for attachment thereto, and a clamp for releasably clamping the end of the extension bar to the tubular sleeve, the clamp including a fixed trunnion extending from the tubular sleeve and a resilient clamp affixed to the extension bar so that the resilient clamp can be releasably clamped to the fixed trunnion when the extension bar slides into the tubular sleeve, the resilient clamp being pivotable between a first position in which it does not interfere with the sliding of the extension bar into the tubular sleeve and a second position in which it prevents the extension bar from being slidably released from the tubular sleeve, and furthermore so that the tubular sleeve can be located inwardly with respect to the end of the vehicle to which the trailer is to be attached.

Vinchattle, U.S. Pat. No. 4,666,177 describes a hitch for coupling a drawbar on a draft vehicle to a tongue bar on a trailer or pulled vehicle including a preferably square tubular housing having a forward end for removable attachment to the drawbar and a rearward end for receiving and removably securing the tongue bar. Projecting from the rearward end is a four sided funnel or hopper shaped tongue bar guide comprising respective top and bottom immovable plates rigidly secured to the top and bottom edges of the housing and movable opposed side plates each hingedly secured to opposed sides of the housing so as to be separately movable away from and into abutment with the top and bottom plates. Spring means yieldingly hold the side plates in abutment with the top and bottom plates and a releasable locking assembly within the housing holds the side plates immovable while the tongue bar is being introduced and guided into the housing. A spring loaded hitch pin on the housing automatically engages the tongue bar at a predetermined point of movement with the tongue bar engaging the locking assembly to release it so that each side plate can yield and swing outwardly from contact by the tongue bar in a turning movement during travel. The side plates are automatically returned to locked position when the tongue bar is unhitched and removed from the housing.

LeVee, U.S. Pat. No. 4,669,748 describes a secured enclosure including a multi-compartmental enclosure, each compartment having a watertight door. The enclosure includes a powered vent system to provide circulation of air through the enclosure and a hitch receiving well formed in the enclosure for receiving a hitch for attaching a pulled vehicle to the pickup truck frame. The fifth wheel hitch of the invention includes engagement means for engaging a pulling vehicle, a mount for the engagement means, which is shiftable between an extended and retracted position, and an obstruction sensor which is operable to detect an impending impact between the pulling vehicle and the towed vehicle during the hitching process. Warning means are operable with the sensor to alert the operator of the impending impact.

Williams, Jr., U.S. Pat. No. 4,759,564 describes an automatic trailer hitch assembly mounting a shank unit on the trailer and a receiving unit on the towing vehicle. The shank unit provides an elongated shank member which mounts the trailer ball at one end coupled to a conventional trailer hitch ball socket housing secured to the trailer and at the opposite end is formed to slide on funnel-like guide passages into the receiving unit. A spring leveler assembly is detachably and adjustably secured as a subassembly to the trailing end of the shank unit, releasably grasps the ball socket housing and retains the shank unit properly positioned for coupling.

Rines, U.S. Pat. No. 5,454,482 describes an apparatus facilitating coupling of a trailer to a tow vehicle including a barrier against which a hitch ball may be positioned in the first stage of a hitching effort. The barrier includes clamps for barrier attachment to the trailer coupling. Support rods and a support plate on the barrier serve to position the barrier rearwardly adjacent the coupler socket. The barrier support plate may be inclined to abut a trailer frame having an inclined frontal surface. To position the trailer coupler laterally into place above a hitch ball, a lever is provided which utilizes the hitch ball as a fulcrum. An arm on the lever is engageable with the coupler to permit the application of force to move the trailer tongue and coupler into place above the hitch ball. Lowering of a trailer mounted jack results in downward engagement with the coupler onto the hitch ball. The barrier and lever are installed and removed without tools.

Draper, U.S. Pat. No. 5,927,742 describes an aligning apparatus which can be removably mounted to or built as an integral part of a towable trailer tongue for vertically aligning the inverted socket of the tongue with the mating ball which is conventionally mounted in cantilevered fashion on the rear end of the towing vehicle. The aligning apparatus includes a horizontally-lying V-shaped guide member having the open end of the V facing the drawbar in the operative position. The V-shaped guide member is positioned relative to the socket such that when the socket is at such a height so as to allow the socket to be positioned above the ball, the vertical center of the legs, the height of each leg constituting a camming surface, is at the height of the drawbar. This tongue height is achieved by use of a standard jack mechanism or pin-height adjustable vertical support pole on the trailer tongue. As the towing vehicle is backed up toward the trailer, if the ball is not aligned with the inverted socket, the drawbar will contact the camming surface of one leg of the V and shift the trailer tongue laterally to vertically align the socket with the ball. After alignment of socket with ball, the apparatus is either pivoted from the trailer tongue or removed to a stowed position so as to not interfere with the rear end of the towing vehicle during towing of the trailer around corners.

Hunter, U.S. Pat. No. 6,341,794 describes a trailer hitch alignment apparatus comprising a first guide member removably attached to a vehicle bumper and a second guide member removably attached to a trailer hitch socket. The first guide member includes a magnetic base with a telescopically extensible rod adjustably coupled thereto. The second guide member includes a magnetic base having an upwardly extending telescopic rod and a downwardly extending semi-flexible shaft attached thereto. The shaft extends downwardly through a bore defined by the trailer hitch tongue so as to contact the trailer hitch ball when the ball and socket are aligned. Contact between the shaft and ball causes vertical displacement of the shaft and guide rod. Therefore, the two telescopic guide rods, visible from a driver's seat, facilitates lateral alignment of the ball and socket while vertical displacement of the second rod indicates perfect forward alignment.

Grasso, et al., U.S. Pat. No. 6,517,098 describes an alignment device to align a vehicle's trailer hitch ball neck assembly with a trailer hitch socket assembly or tongue assembly. The present invention includes two units, each having uprights with engaging press on members. The ball neck upright member has a "C"-shaped bottom portion for frictionally engaging the neck of the trailer hitch ball neck, and the hitch engaging upright member has a "U"-shaped bottom portion for frictionally engaging the outer housing of the hitch socket member around its lower end periphery. When used in conjunction with each other, the two poles visually assist the vehicle operator in aligning the vehicles so that they may be easily coupled together for towing.

Our prior art search with abstracts described above teaches: a towing attachment for attaching trailers to vehicles, hitch construction, a fifth wheel hitch, an adjustable leveling device for automatic trailer hitching, an apparatus for hitching a trailer coupler to a hitch ball, and trailer hitch aligners, but does not teach a neutral weight alignment indicator with hitch pin hole alignment and hitch shank guide. The present invention fulfills these needs and provides further related advantages as described in the following summary.

SUMMARY OF THE INVENTION

The present invention teaches certain benefits in construction and use which give rise to the objectives described below.

Common hitch arrangements include a hitch receiver which is usually a square open pipe mounted on a towing vehicle and oriented horizontally, terminating at the rear-center of the vehicle, and a hitch shank, generally a pipe with closed ends, and sized to insert into the receiver. The shank provides a coupling ball to which a trailer's coupling socket is engaged. Although socket and ball are mutually captured, the socket is not able to decouple from the ball inadvertently, but is able to share mutual movement during towing operations. Shank and receiver each have a transverse oriented pair of holes which take a hitch pin for retaining shank in receiver. In common use of such trailer hitches, several difficulties arise. When separating a trailer from a towing vehicle to which it is attached it is often desired to do so by pulling the hitch shank from the hitch receiver rather then by separating socket and ball. However, when jacking the trailer hitch, it is not usually possible to know when hitch shank and hitch receiver are in neutral, that is, when neither is resting on the other. Attempting to pull the hitch pin when not in neutral can often be impossible as the shank exerts a force on the pin and within the receiver. Thus, there is a need for a neutral position indicator of simple and inexpensive construction, yet effective in use. Further, there are many straight hitch receiver pipes in use and it is difficult to position a heavy trailer and a vehicle so that shank is aligned with receiver when coupling. To solve this problem, there is a need for a funnel shaped receiver mouth that can be quickly and easily clamped onto an existing straight receiver pipe so that, when coupling, a slight misalignment of shank and receiver can be overcome. Finally, it is typically impossible to know when shank and receiver hitch pin holes are aligned without frustrating experimentation. There is, therefore, a need for an engagement penetration limiting device, or method, so that a shank cannot penetrate the receiver pipe further than to align the holes for easy entry of a hitch pin. The present invention provides solutions to these and other problems.

In the present invention a hitch receiver has a clamp-on funnel shaped open mouth for receiving and guiding a hitch shank entry. Attached in the open mouth of the hitch receiver, a shank neutral position indicator includes a generally horizontal spring mounted with one end of the spring fixed loosely at one side of the open mouth and an opposing end of the spring loosely held and movable within a vertical elongate slot on the other side of the open mouth. The spring is positioned such that with a hitch shank centered within the hitch receiver, the hitch shank moves the spring to a center position of the elongate slot thereby indicating that receiver and shank are mutually free for disengagement. A hitch shank engagement limiter within the hitch receiver, has an adjustable length which is selected for stopping hitch shank entry travel into the hitch receiver when receiver and shank hitch pin holes are aligned. An alternative limiter is bolted to the shank itself and abuts the open mouth when the shank is fully inserted for pin hole alignment.

A primary objective of the present invention is to provide an apparatus and method of use of such apparatus that yields advantages not taught by the prior art.

Another objective is to provide such an invention capable of indicating hitch shank neutral position in a hitch receiver.

A further objective is to provide such an invention capable of adapting a straight hitch receiver so as to enable it to guide a hitch shank for insertion.

A still further objective is to provide such an invention capable of limiting hitch shank penetration into a hitch receiver so that receiver and shank hitch pin holes are aligned.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
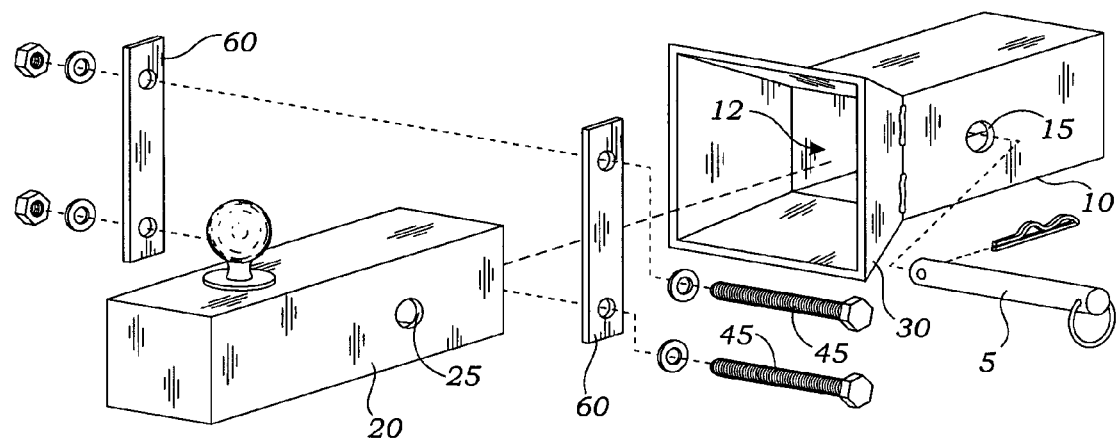
FIG. 1 is an exploded perspective view of the invention showing a shank engagement limiter thereof.
Figure 2:
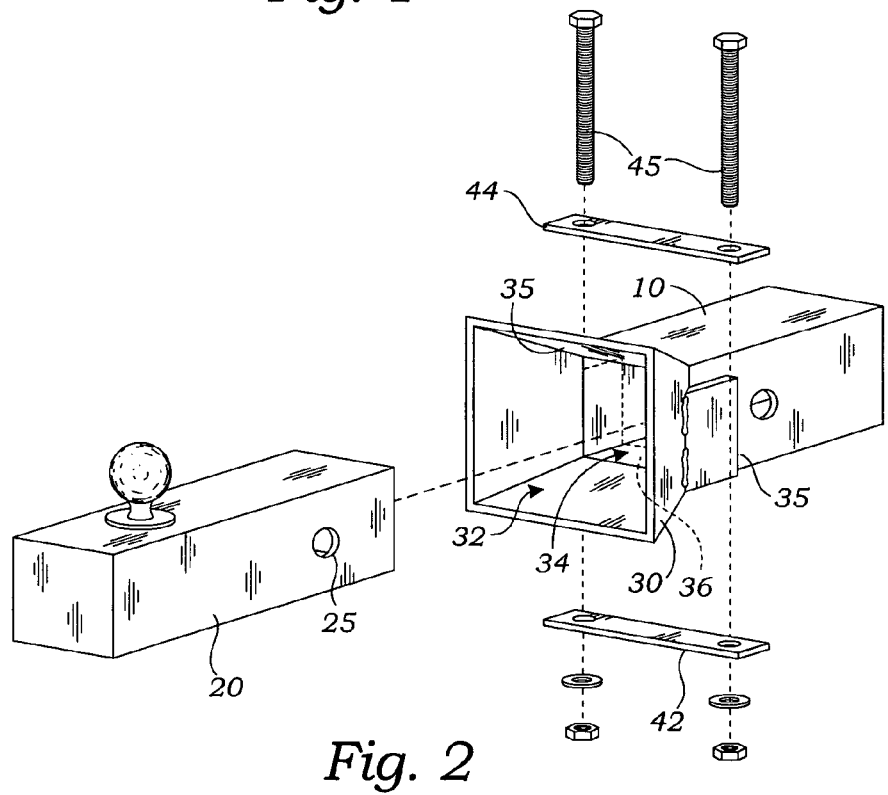
FIG. 2 is an exploded perspective view of the invention showing a bolt-on funnel thereof.
Figure 3:
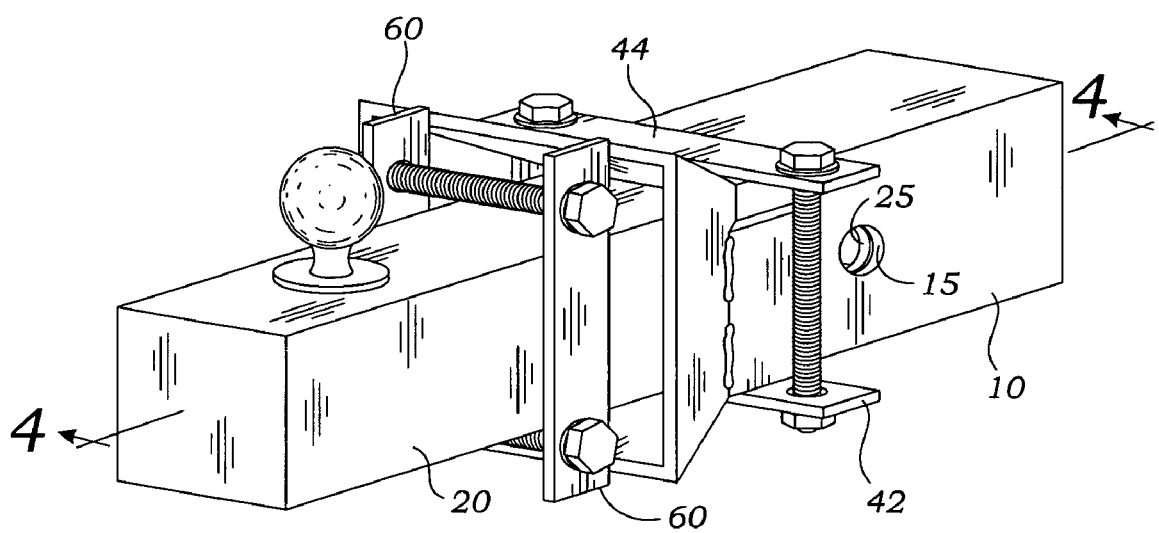
FIG. 3 is an assembled perspective view of the elements of FIGS. 1 and 2.
Figure 4:
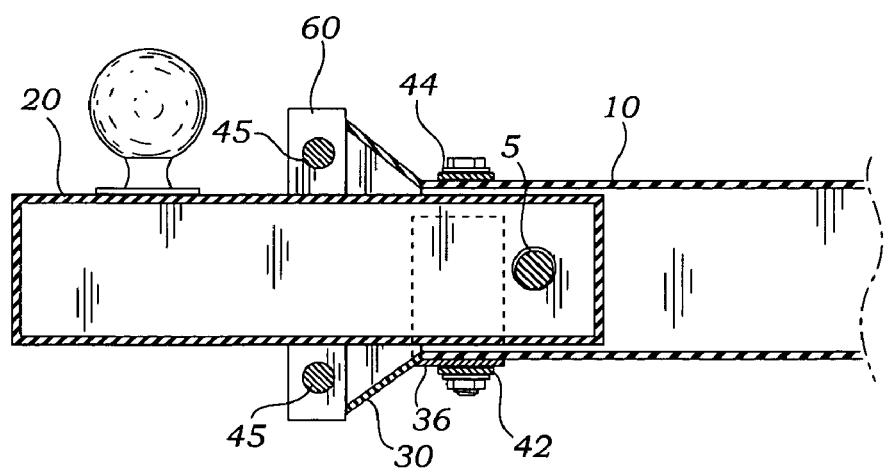
FIG. 4 is a cross-section view taken at section line 4—4 in FIG. 3.

The present invention is a hitch apparatus and positioning system. As shown in FIG. 1, a typical hitch receiver 10 terminates with an open mouth 12 for receiving a hitch shank 20. A funnel 30 is preferably mounted at the receiver's open mouth 12 to help align the shank 20 with the receiver 10. Such a funnel 30 may be easily welded or otherwise permanently attached at the open mouth 12 of the receiver 10 as shown in FIG. 1. In the present invention, a clamp-on funnel 30 is provided for the many existing receivers 10 that are not fitted with a permanent funnel 30 at the open receiver mouth 12. See FIG. 2. The clamp-on funnel 30 includes a four sided funnel having a large outer opening 32 and a smaller inner opening 34, the inner opening 34 being the same size as the mouth 12 of the receiver 10. Side plates 35 (and a bottom plate 36 not visible in FIG. 2) are welded to the funnel 30 as shown in FIG. 2. The plates 35, 36 are positioned to abut the outer surfaces of the receiver 10 on both sides and the bottom. A clamp 40 provides upper 42 and lower 44 clamp bars, and a pair of opposing clamp bolts with fastening hardware 45. This clamp arrangement is mounted as shown in FIG. 3 so as to hold the funnel 30 with its side 35 and bottom 36 plates in contact with the receiver 10.

Figure 5:
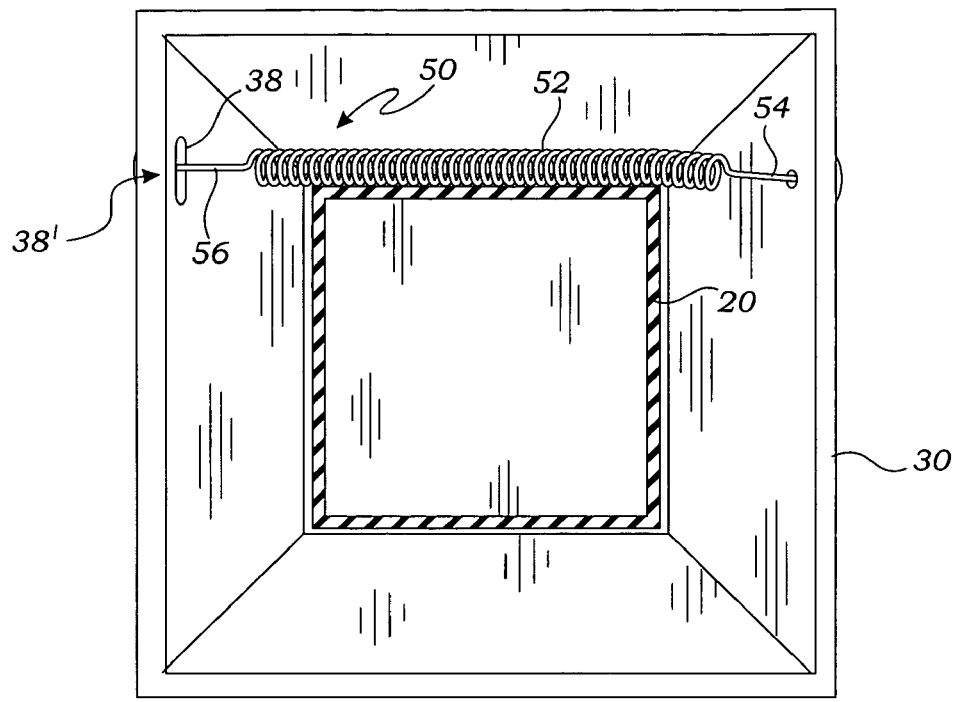
FIGS. 5–7 are frontal elevational views thereof showing the shank in section inserted within the funnel in neutral, high and low positions respectively as indicted by a position indicator of the invention.
Figure 6:
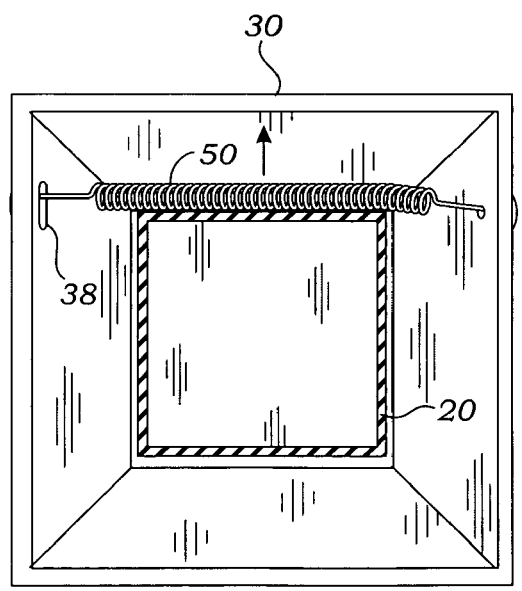
Figure 7:
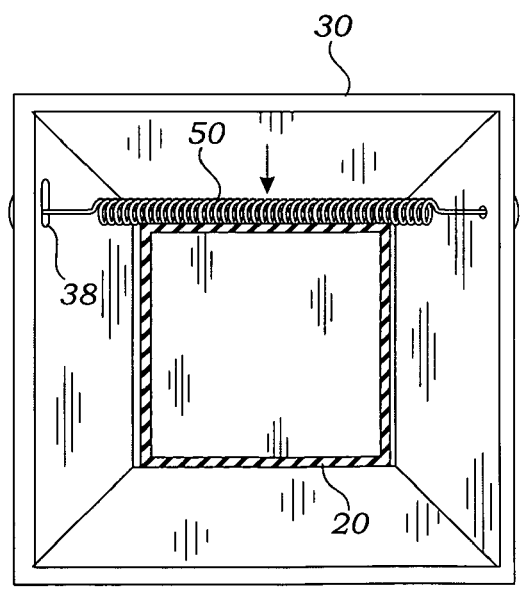

Preferably, as shown in FIG. 5, a shank neutral position indicator 50 is attached to the funnel 30. The neutral position indicator 50 comprises a generally horizontal spring 52 mounted with one end 54 of the spring 52 engaged at one side of the funnel 30 and an opposing end 56 of the spring 50 loosely held and movable within a vertical elongate slot 38 in the other side of the funnel 30. The spring 52 is positioned such that with the hitch shank 20 centered within the hitch receiver 10, as shown in FIG. 5, the hitch shank 20 interferes with the spring 50 pushing it upwards to a centered position 38' in the elongate slot 38. Thus, by this means, it is possible to determine when the neutral position is reached when a trailer is jacked-up for unhitching. FIG. 6 shows the condition when the hitch shank 20 is too high and FIG. 7 shows the condition when the hitch shank 20 is too low. In both of the later conditions, interference between the receiver 10 and shank 20 may cause difficulty in withdrawing the shank 20 from the receiver 10.

Preferably, the present invention further comprises a pair of stop plates 60 fixed on the hitch shank 20 and positioned thereon so that with the hitch shank 20 inserted into the hitch receiver 10 and the stop plates 60 in contact with funnel 30 (or the open mouth of the receiver 10), receiver and shank hitch pin holes, 15 and 25 respectively, are aligned for inserting a hitch pin 5, as is well known in the art for engaging the receiver 10 and the shank 20 (See FIG. 1).

Figure 8:
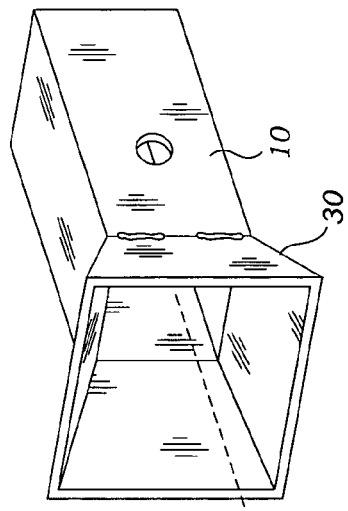
FIG. 8 is an exploded perspective view of the invention showing a receiver inserted shank engagement limiter thereof.
Figure 9:
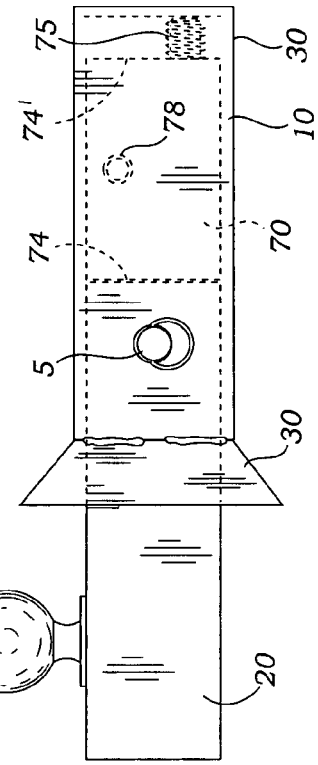
FIG. 9 is a side elevational view of the invention with an extension element of the engagement limiter in contact with a rear wall of the receiver.
Figure 10:
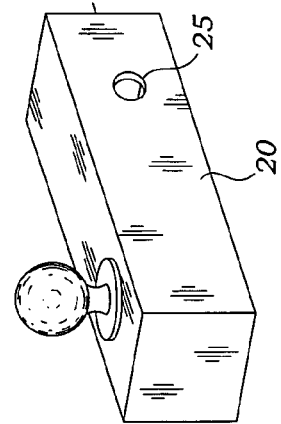
FIG. 10 is a side elevational view of the invention with the extension element in contact with a closed end of the shank.

As an alternative, or supplementary means for assuring hitch pin hole 15 and 25 alignment, the invention further comprises a hitch shank engagement limiter 70 which is placed within the hitch receiver 10. The hitch shank engagement limiter 70 fills the receiver 10 to the degree that the shank 20 is stopped from being further inserted when it abuts the limiter 70 as shown in FIGS. 8 and 9. The limiter 70 is adaptable with adjustable length so as to meet the requirements of a range of receiver 10 and shank 20 sizes, lengths and hitch pin hole locations. The limiter 70 is made up of a section of square tube 72, preferably with open ends 74 and 74'. An extension element 76 is fixedly mounted within the square tube 72 and may be extended in the general direction of the receiver's longitudinal axis 11. Preferably, this extension is by threading a rotatable portion 75 of the extension element 70 within a fixed portion 75'. With the extension element 76 retracted it does not extend beyond the open end 74' of the square tube 72. However, the limiter 70, in general, must be lengthened to fit each one of various situations where the length of shank 20 or the position of its hitch pin hole 25 varies. With the extension element 76 extended so as to lengthen the limiter 70, one may assure alignment of the receiver and the shank hitch pin holes 15, 25. When the shank 20 is an open tube, the end 74 of the limiter is positioned in contact with the terminal end of shank 20, as shown in FIG. 8; and when the shank 20 is closed at its terminal end, either the end 74 or the extension element 76 may be placed for abutment with the shank 20, as shown in FIG. 9. As shown in FIG. 7, a restrictor 78, such as a spring may be engaged laterally with the extension element 70 to cause drag between element 70 and the interior walls of the receiver 10 so that the extension element 70 is prevented from rattling when in use and to prevent it from easily falling out of the receiver 10 when no shank 20 is present.

The enablements described in detail above are considered novel over the prior art of record and are considered critical to the operation of the instant invention and to the achievement of the above described objectives. The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A trailer hitch apparatus comprising: a trailer hitch receiver having a funnel mouth for receiving a hitch shank, and engaged with the funnel mouth or the hitch receiver, a shank neutral position indicator positioned across the funnel mouth, the neutral position indicator enabled for indicating when the hitch shank is vertically centered within the hitch receiver.

2. The apparatus of claim 1 wherein the neutral position indicator comprises a generally horizontal spring mounted with one end of the spring engaged at one side of the funnel mouth and an opposing end of the spring positioned within a vertical elongate slot in an opposing side of the funnel mouth, the spring positioned relative to the funnel mouth such that with the hitch shank vertically centered within the hitch receiver, the opposing end of the spring is urged by the hitch shank to a central position within the elongate slot, whereby, neutral load for uncoupling is indicated.

3. The apparatus of claim 1 wherein the funnel mouth is engaged with the hitch receiver using a clamp.

4. The apparatus of claim 1 further comprising a stop plate selectively positioned on the hitch shank so that with the hitch shank inserted into the hitch receiver and with the stop plate in contact with the funnel mouth, receiver and shank hitch pin holes are aligned.

5. The apparatus of claim 1 further comprising a hitch shank engagement limiter within the hitch receiver, the hitch shank engagement limiter having an adjustable length, the length of the hitch shank engagement limiter selected for abutting the hitch shank when receiver and shank hitch pin holes are aligned.

6. A hitch apparatus and system comprising: a hitch receiver having a clamp-on funnel shaped mouth for receiving and guiding a hitch shank into the hitch receiver, and attached in the mouth or the hitch receiver, a shank neutral position indicator comprising a generally horizontal spring mounted with one end of the spring engaged at one side of the funnel mouth and an opposing end of the spring loosely engaged in, and movable within a vertical elongate slot on the opposing side of the funnel mouth, the spring positioned such that with a hitch shank vertically centered within the hitch receiver, the hitch shank contacts and urges the opposing end of the spring to a central position in the elongate slot; a stop plate fixed on the hitch shank positioned so that with the hitch shank inserted into the hitch receiver and the stop plate in contact with the funnel mouth of the hitch receiver, receiver and shank hitch pin holes are aligned.

7. A hitch apparatus and system comprising: a hitch receiver having a clamp-on funnel shaped mouth for receiving and guiding a hitch shank into the hitch receiver, and attached in the open mouth of the hitch receiver, a shank neutral position indicator comprising a generally horizontal spring mounted with one end of the spring engaged at one side of the funnel mouth and an opposing end of the spring loosely engaged and movable within a vertical elongate slot in the other side of the funnel mouth, the spring positioned such that with a hitch shank vertically centered within the hitch receiver, the spring is moved to a center point of the elongate slot; and a hitch shank engagement limiter within the hitch receiver, the hitch shank engagement limiter having an adjustable length, the length of the hitch shank engagement limiter selected for abutting the hitch shank when receiver and shank hitch pin boles are aligned.

* * * * *

UNITED STATES PATENT AND TRADEMARK OFFICE
CERTIFICATE OF CORRECTION

| | | |
|---|---|---|
| PATENT NO. | : 7,025,371 B2 | Page 1 of 1 |
| APPLICATION NO. | : 10/818264 | |
| DATED | : April 11, 2006 | |
| INVENTOR(S) | : Harold Allen and Garry Schkade | |

It is certified that error appears in the above-identified patent and that said Letters Patent is hereby corrected as shown below:

On Title Page, Col. 1 Item (76)

Please change the spelling of the co-inventor's name from "Garry Schrade" to -- Garry Schkade. --

Signed and Sealed this

Twelfth Day of September, 2006

JON W. DUDAS
*Director of the United States Patent and Trademark Office*